UNITED STATES PATENT OFFICE.

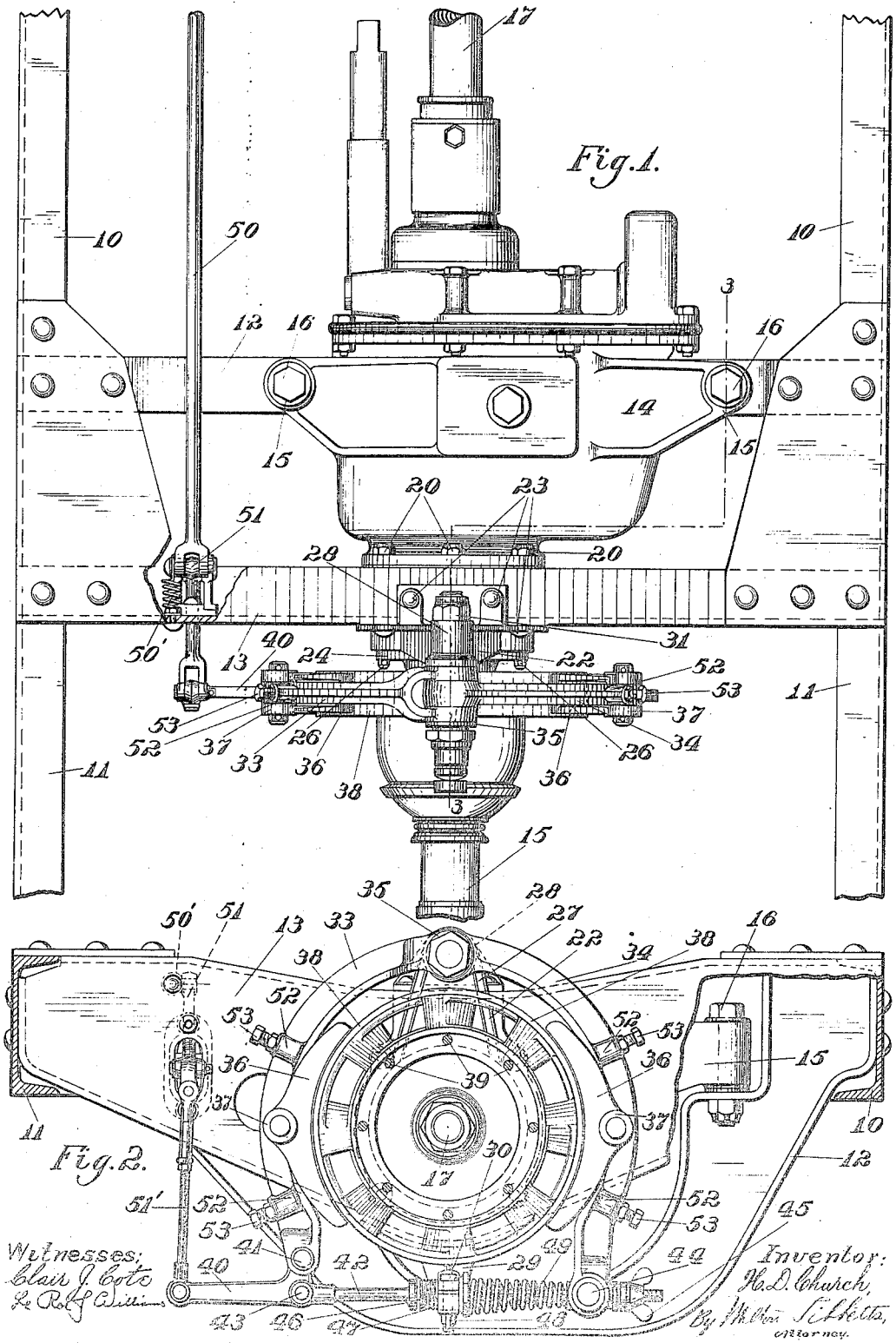

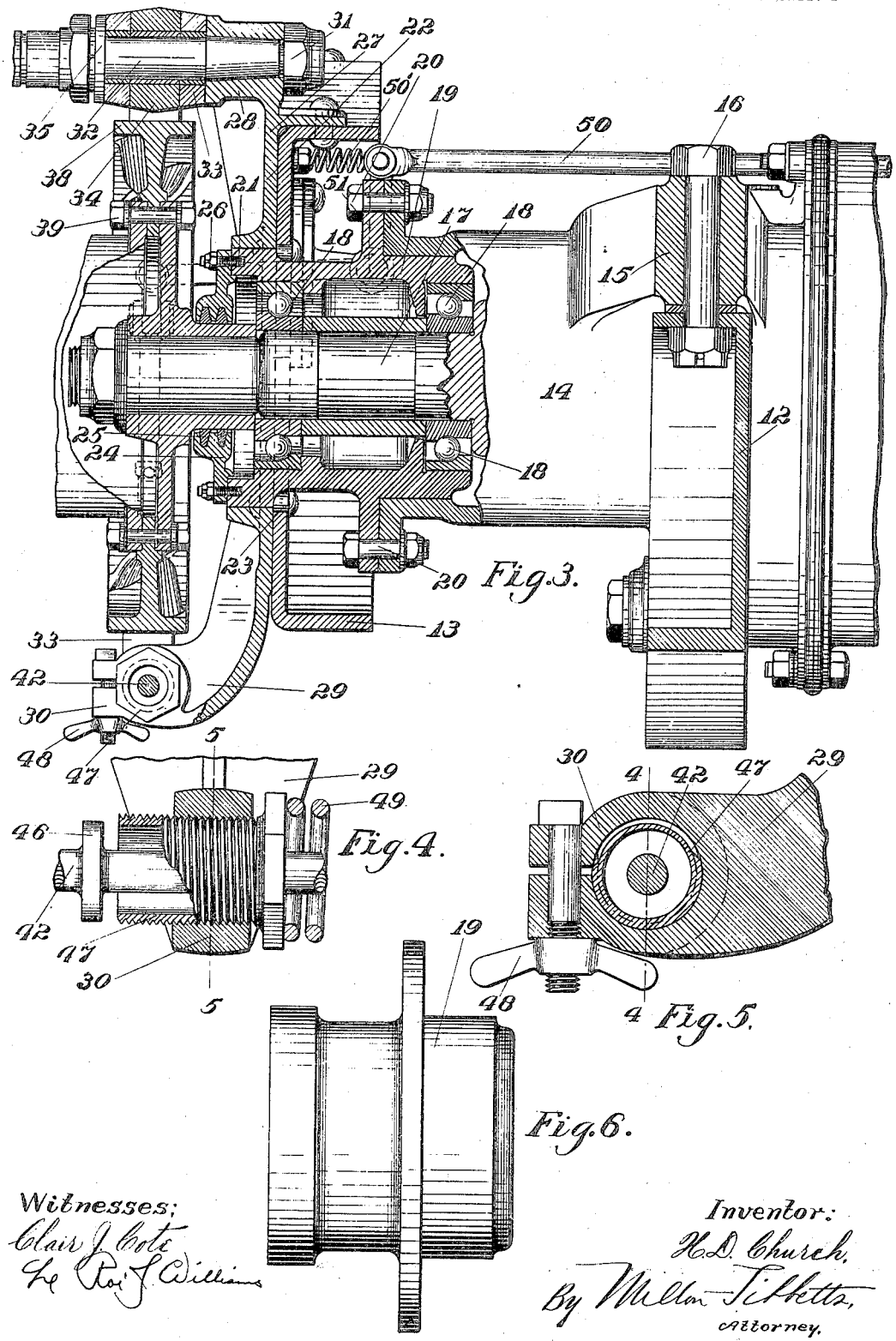

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,234,290.  Specification of Letters Patent.  Patented July 24, 1917.

Application filed October 3, 1914. Serial No. 864,842.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles and particularly to the driving and braking mechanism thereof.

One of the objects of this invention is to provide an improved mounting for the transmission mechanism casing of a motor vehicle.

Another object is to provide a casing for the transmission mechanism which may be flexibly mounted on the vehicle.

Another object is to provide in a transmission casing, an improved means of supporting the anti-friction bearings therein.

Another object is to provide in a transmission casing, a supporting member for the anti-friction bearings therein, which support may be also used as a means of flexibly mounting the casing on the vehicle.

Another object is to provide a transmission casing which may be rigidly supported at two points, and rotatably or flexibly mounted at a third point on the frame of the vehicle.

Another object of this invention is to provide an improved means of mounting the brake mechanism and transmission casing on the frame of the vehicle.

Another object is to provide an improved form of transmission brake mechanism which may be so secured to the frame of the vehicle adjacent the transmission mechanism casing, that the braking strains of the non-rotating brake elements are not transmitted to the said casing.

Another object is to provide a brake mechanism comprising a brake drum mounted on a propeller shaft which is mounted in the transmission mechanism casing, and provide a support for the non-rotating braking elements which coöperate with the braking drum, the support or bracket also supporting the transmission casing on the frame in such a manner that the braking strains of the braking elements are not transferred to the transmission casing.

Another object is to provide an improved means of adjusting the braking elements and braking shoes relative to the braking drum.

Other objects will appear from the following description taken in connection with the accompanying drawings which form a part of this specification and in which:—

Figure 1 is a plan view of a portion of a motor vehicle embodying a form of the transmission casing and brake mechanism which are the subjects matter of this application;

Fig. 2 is a rear elevation of the parts shown in Fig. 1, showing parts broken away;

Fig. 3 is a longitudinal vertical section approximately on the line 3—3 of Fig. 1;

Fig. 4 is a longitudinal vertical section approximately on the line 4—4 of Fig. 5, having some parts broken away and some in elevation to more clearly show the adjusting feature;

Fig. 5 is a transverse vertical section approximately on the line 5—5 of Fig. 4; and Fig. 6 is a detail view of a form of supporting member for the transmission casing and bearing therein.

Referring to the drawings, the frame 10 comprises side members 11 and transverse members 12 and 13. A casing 14 for the transmission or speed change mechanism is shown as having lugs 15 through which the casing may be secured as by bolts 16 at two points on the frame.

Referring particularly to Fig. 3, a driving or propeller shaft 17 is shown as rotatably mounted in anti-friction bearings 18 which are mounted in a supporting member 19. This supporting member may be detachably secured to the casing 14 as by bolts and nuts 20, and flexibly or rotatably mounted in the opening 21 of the bracket or supporting member 22 which may be secured as by rivets 23 to the transverse frame member 13.

The casing 14 is adapted to carry oil for the proper lubrication of the rotating elements therein, and to prevent the leakage of oil therefrom an oil retaining ring 24 having packing 25 arranged therein adjacent the shaft 17, is suitably secured as by bolts 26 to the supporting member 19.

The bracket 22 is shown as having an upwardly extending portion 27 having a boss 28 arranged thereon and having a downwardly extending portion 29 having a split boss 30 formed integral therewith. Suitably secured in the boss 28 as by nut 31, is a trunnioned or fixed pivot 32 having brake arms or elements 33 and 34 suitably journaled thereon adjacent one of their respective ends, the arms being held on said fixed pivot 32 as by the shoulder 35 shown as formed integral with said pivot.

At 36 are brake shoes having ears 37 formed thereon intermediate their respective ends and adapted to be pivotally mounted on the brake elements 33 and 34, respectively. These brake elements and their respective shoes 36 are adapted to be brought in contact, in a manner more fully hereinafter described, with the brake drum 38, which is suitably secured to the propeller shaft 17 as by nuts 39.

Pivotally secured to the lower end of the brake arm 33 is an actuating lever 40 adapted to be swung about the pivot 41 for operating the connecting link 42 which is pivotally secured thereto at one end as at 43, and is also pivotally secured at its opposite end to the lower portion of the brake arm 34 as at 44. It will be seen that the distance between pivots 43 and 44 may be varied by means of the wing nut 45, which secures said link to the lower portion of the arm 34.

It will be seen that arranged on the link 42 is a stop 46 which is limited in its movement in one direction by means of the adjustable abutment 47 which is threaded in the boss 30 and locked by means of the wing nut 48. Surrounding the link 42 and extending between the lower end of the arm 34 and said abutment 47, is a retracting means in the form of the spring 49, the tension of which may be varied by means of the adjustable abutment 47 and the wing nut 45.

From the above description it will be seen that when the brake operating rod 50 is moved forwardly in any well known manner, the bell crank 51 will raise the arm of the actuating lever 40 upwardly by means of the link 51', bringing the brake arms 33 and 34 into contact with the brake drum 38 and upon release of the rod 50 the spring 49 will be caused by the adjustable abutment 47 to move the arm 34 away from the brake drum until the stop 46 is limited in its movement also by the abutment 47, and then a further releasing movement of the rod 50 is caused by a second retracting spring 50' to retract the brake arm 33 from the drum. Thus it will be seen that means are provided which coöperate with the abutment 47 to disengage both of the brake arms. And in order to assure a perfect contact between the brake shoes 36 and the drum 38, there are formed in the arms 33 and 34, respectively, bosses 52, in which are adjustably secured bolts 53, which coöperate with the adjustable abutment 47 to center the shoes relative to the drum and thus the shoes may at all times be kept concentric with the brake drum.

It will also be seen from the above description that by means of the mounting provided for the brake elements and the transmission casing, the braking strains of the arms 33 and 34 are transmitted directly to the transverse member 13 preventing any torsional strains from the brake shoes from being transferred to the transmission casing 14, which is rotatably mounted in the bracket 22.

Having thus described my invention, what I claim and desire to secure by Letters Patent is:—

1. In a motor vehicle, the combination with the frame, of a shaft carried thereby, a brake drum on said shaft, a pair of brake arms adapted to coöperate with said drum, each brake arm being carried at one end by a pivot on the frame, a link pivotally connecting the other ends of said arms, an adjustable abutment intermediate the ends of said link, a stop on said link, and a spring arranged between said stop and one of said arms, said abutment being adapted to coöperate with said stop and spring to cause one of said arms to move away from said drum.

2. In a motor vehicle, the combination with the frame, of a shaft carried thereby, a brake drum on said shaft, a bracket secured to said frame, a pair of brake arms pivotally connected with said bracket, means for bringing said brake arms into engagement with said drum, an adjustable abutment arranged on said bracket, and means coöperating with said abutment for disengaging both of said arms from said drum.

3. In a motor vehicle, the combination with the frame, of a shaft carried thereby, a brake drum on said shaft, a bracket secured to said frame, a pair of brake arms pivotally connected with said bracket, means for bringing said brake arms into engagement with said drum, an adjustable abutment arranged between said arms, and means for coöperating with said abutment for disengaging both of said arms from said drum.

4. In a motor vehicle, the combination with the frame, of a shaft carried thereby, a brake drum on said shaft, a bracket secured to said frame, a pair of brake arms pivotally connected with said bracket and arranged on opposite sides of the drum, an adjustable abutment arranged between said arms, and means coöperating with said abutment for disengaging both of said arms from said drum.

5. In a motor vehicle, the combination with the frame, of a shaft carried thereby, a brake drum on said shaft, a pair of brake arms adapted to coöperate with said drum, each of said arms being carried at one end by a pivot fixed on the frame, a lever pivoted to one of said arms, a link pivotally connected with said lever and having pivotal connection with the other of said arms, means for retracting said lever, an adjustable abutment, a stop on said link, and a spring engaging said abutment, said stop and spring being adapted to cause said arms to move away from said drum.

6. In a motor vehicle, the combination with the frame, of a shaft carried thereby, a brake drum on said shaft, a pair of brake arms each of which is pivotally connected at one end to said frame and is provided with a brake shoe adapted to engage said drum, an actuating lever pivotally connected with one of said arms, means for retracting said lever, a link pivotally connected at one end with said lever and at its other end with the other of said arms, an adjustable abutment, a spring inclosing said link engaging said abutment and adapted to move one of said brake arms away from said drum, and a stop on said link adapted to engage said abutment and cause the other of said arms to move away from said drum.

7. In a motor vehicle the combination with the frame of a shaft carried thereby, a brake drum on said shaft, oppositely disposed non-rotating brake elements, an adjustable abutment located intermediate the meeting ends of said brake elements, means for bringing said brake elements in contact with said drum, and resilient means acting against said abutment to cause one of said brake elements to move away from said drum upon releasing said first named means.

8. In a motor vehicle, the combination with the frame, and the transmission mechanism comprising a propeller shaft, of a casing therefor having a connection at two points with said frame, and a trunnioned connection with said frame at a third point, and a brake element having a non-rotatable connection with said frame adjacent said trunnioned connection.

9. In a motor vehicle, the combination with the frame, of a driving shaft, a casing therefor having a rigid connection with said frame at two points and a trunnioned connection with said frame at a third point, a brake drum on said shaft, and a non-rotating brake element coöperating with said drum, said brake element being mounted on said frame adjacent the trunnioned connection.

10. In a motor vehicle, the combination with the frame and the transmission mechanism comprising a driving shaft, of a supporting bracket mounted on said frame, a casing for the driving shaft having a rigid connection at one end with said frame and having a trunnioned connection at the other end in said bracket, and brake elements mounted on said supporting bracket.

11. In a motor vehicle, the combination with the frame, and the transmission mechanism, of a casing for said mechanism, a supporting member detachably secured to said casing and provided with bearings for the transmission mechanism, said supporting member having a rotatable connection with said frame.

12. In a motor vehicle, the combination with the frame, and the transmission mechanism comprising a driving shaft, of a supporting bracket mounted on said frame, a casing for the driving shaft, rigidly mounted at one end on said frame, a supporting member detachably secured to said casing at the other end, said supporting member having a trunnioned connection with said bracket, a brake drum on said shaft and brake elements coöperating with said drum and mounted on said bracket.

13. In a motor vehicle, the combination with the frame, and the transmission mechanism comprising a driving shaft, of a supporting bracket mounted on said shaft, of a supporting bracket mounted on said frame, a casing for the driving shaft rigidly mounted at one end on said frame, a supporting member detachably secured to said casing at the other end, and provided with bearings on which said shaft turns, said supporting member having a trunnioned connection with said bracket, a brake drum on said shaft and brake elements coöperating with said drum and mounted on said bracket.

In testimony whereof I affix my signature in the presence of two witnesses.

HAROLD D. CHURCH.

Witnesses:
LE ROI J. WILLIAMS,
CLAIR J. COTE.